(12) United States Patent
Liao (10) Patent No.: US 9,230,466 B2
(45) Date of Patent: Jan. 5, 2016

(54) DISPLAY DEVICE AND IMAGE DISPLAYING METHOD THEREOF

(71) Applicant: Shenzhen China Star Optoelectronics Technology Co., Ltd., Shenzhen, Guangdong (CN)

(72) Inventor: Qiaosheng Liao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/360,629

(22) PCT Filed: Apr. 10, 2014

(86) PCT No.: PCT/CN2014/075060
§ 371 (c)(1),
(2) Date: May 26, 2014

(65) Prior Publication Data
US 2015/0279255 A1    Oct. 1, 2015

(30) Foreign Application Priority Data
Mar. 27, 2014 (CN) .......................... 2014 1 0119158

(51) Int. Cl.
| | | |
|---|---|---|
| G09G 3/00 | (2006.01) | |
| G09G 3/36 | (2006.01) | |
| G02F 1/1368 | (2006.01) | |
| G02F 1/1335 | (2006.01) | |
| G02F 1/1343 | (2006.01) | |

(52) U.S. Cl.
CPC .............. *G09G 3/003* (2013.01); *G02F 1/1368* (2013.01); *G02F 1/13439* (2013.01); *G02F 1/133514* (2013.01); *G02F 1/133526* (2013.01); *G02F 1/134336* (2013.01); *G09G 3/3677* (2013.01); *G09G 2310/02* (2013.01); *G09G 2320/02* (2013.01)

(58) Field of Classification Search
CPC ............ H04N 13/044; H04N 13/0443; H04N 13/045; H04N 13/0459; H04N 13/0477; H04N 13/0486; H04N 2213/001; H04N 5/2256; H04N 5/23232
See application file for complete search history.

(56) References Cited

U.S. PATENT DOCUMENTS

| | | | | |
|---|---|---|---|---|
| 6,630,971 B1* | 10/2003 | Woo | ................... | G02F 1/133753 349/110 |
| 2003/0184698 A1* | 10/2003 | Ohta | ................. | G02F 1/134363 349/139 |
| 2005/0140856 A1* | 6/2005 | Choi | ................. | G02F 1/133512 349/110 |
| 2007/0115409 A1* | 5/2007 | Oka | .................. | G02F 1/134336 349/113 |
| 2013/0002974 A1* | 1/2013 | Minato | .................. | G02B 5/201 349/43 |

* cited by examiner

*Primary Examiner* — Olga Merkoulova
(74) *Attorney, Agent, or Firm* — JMB Davis Ben-David (57) ABSTRACT

A display device is provided and includes a display panel and a lens board. The lens board is stacked with the display panel. A thin film transistor (TFT) array substrate of the display panel includes a first scan line and a second scan line. A first strip bar electrode in a first pixel portion and a second strip bar electrode in a second pixel portion are arranged in an array along a direction parallel to the first scan line. The first straight line of the first strip bar electrode is intersected with the second straight line of the second strip bar electrode.

20 Claims, 5 Drawing Sheets

DISPLAY DEVICE AND IMAGE DISPLAYING METHOD THEREOF

FIELD OF THE DISCLOSURE

The present invention relates to the field of a display device, and more particularly relates to a display device and an image displaying method thereof.

BACKGROUND OF THE DISCLOSURE

Figure 1:
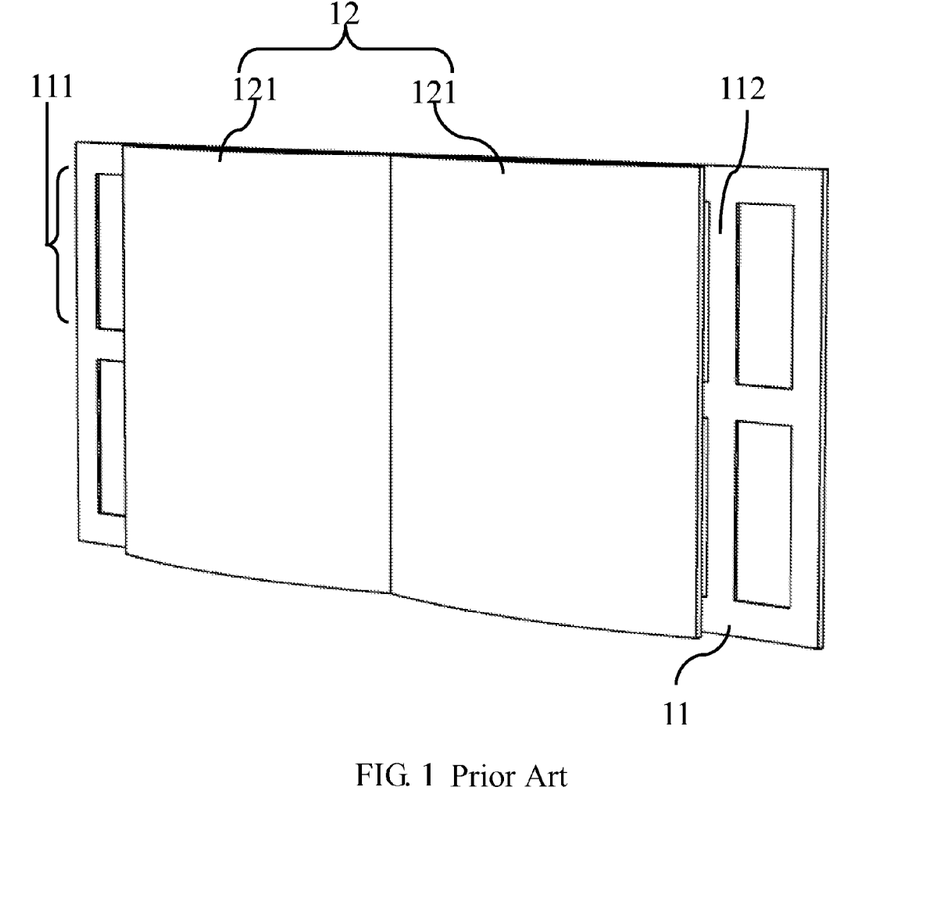
FIG. 1 is a structural view of a conventional 3D display device.

The conventional three-dimensional (3D) display device generally includes a display panel 11 and a lens board 12, and the display panel 11 is stacked with the lens board 12. The lens board 12 is configured for respectively transmitting the left eye image light and the right eye image light generated by the display panel 11 to the left eye and the right eye of the user.

The lens board 12 includes at least two strip bar lenses 121, and the strip bar lenses 121 are disposed in parallel. The straight lines in the strip bar lenses 121 are vertical with respect to the pixel rows 111 of the display panel 11. The straight line in the strip bar lenses 121 and the pixel column of the display panel 11 are in parallel.

In the display panel 11, a black matrix (BM) layer exists between two of the adjacent pixels. The black matrix layer includes several spacing bars 112, and the spacing bars 112 are vertical or parallel with respect to the pixel rows 111. The spacing bar 112 with the same interval forms a spacing bar array. According to the view from the horizontal direction (the direction of the pixel rows), the structure of the spacing bar array looks periodically similar. In addition, the strip bar lenses 121 with the same interval of the lens board 12 forms a lens array. The structures of the lens array and the strip bar array in the horizontal direction (the direction of the pixel rows) are periodically similar.

Accordingly, the inventor discovers that the conventional arts include the following problems.

When light passes through the black matrix layer and the lens board 12, an optics interruption occurs in the horizontal direction. Therefore, several black and white strips (also called Moiré pattern) are shown in the display zone and the Moiré pattern will decrease the display quality of the display device.

Accordingly, it is necessary to develop a novel solution to solve the aforementioned technical problem.

SUMMARY OF THE INVENTION

One objective of the present invention is to provide a display device and an image displaying method thereof to avoid the generation of the Moiré pattern so as to enhance the display quality.

In order to solve the technical problem described above, one technical propose provided in the present invention is a display device, comprising a display panel comprising a thin film transistor (TFT) array substrate, a color filter substrate and a liquid crystal (LC) layer, and the TFT array substrate comprises: at least one pixel row unit arranging in an array and comprising: a first scan line; a second scan line; and at least one pixel unit comprising: a first pixel portion including a first switch and at least one first strip bar electrode, and the first switch is electrically connected with the first strip bar electrode and the at least one first strip bar electrode is arranged in an array along a direction parallel with the first scan line; and a second pixel portion including a second switch and at least one second strip bar electrode, and the second switch is electrically connected with the second strip bar electrode and the at least one second strip bar electrode is arranged in an array along a direction parallel with the second scan line; wherein a first straight line of the first strip bar electrode is intersected with a second straight line of the second strip bar electrode, and the second scan line is intersected with the second switch, the first scan line is configured for sending a first scan signal to the first switch to control turning on or off a first current channel between the first strip bar electrode and a data line, the second scan line is configured for sending a second scan signal to the second switch to control turning on or off a second current channel between the second strip bar electrode and the data line; and a lens board being stacked with the display panel and the lens board comprises: a lens array comprising at least two strip bar lenses and the at least two strip bar lenses are arranged in parallel, and a first angle exists between the straight line of the strip bar lens and a connection line between the first pixel portion and the second pixel portion; wherein the first switch is configured for turning on the first current channel when the display device is in a 2D display mode for 2D image data transmitting into the first strip bar electrode; the second switch is configured for turning on the second current channel when the display device is in the 2D display mode for the 2D image data transmitting into the second strip bar electrode; the first switch is configured for turning off the first current channel when the display device is in a 3D display mode for stop 3D image data transmitting into the first strip bar electrode; the second switch is configured for turning on the second current channel when the display device is in the 3D display mode for the 3D image data transmitting into the second strip bar electrode.

According to the aforementioned display device, the first angle is between 10° and 80°.

According to the aforementioned display device, a second angle exists between the first straight line and the connection line, and an absolute value of the second angle is larger or smaller than the absolute value of the first angle.

According to the aforementioned display device, a third angle exists between the second straight line and the connection line, and an absolute value of the third angle is larger or smaller than the absolute value of the first angle.

According to the aforementioned display device, the first strip bar electrode tilts to a direction the same as the strip bar lens thereof.

According to the aforementioned display device, a forth angle between the first straight line of the first strip bar electrode and the third straight line of the strip bar lens is between 0° and 60°.

According to the aforementioned display device, the forth angle is equal to or smaller than 45°.

A display device comprises a display panel comprising a thin film transistor (TFT) array substrate, a color filter substrate and a liquid crystal (LC) layer, and the TFT array substrate comprises at least one pixel row unit arranging in an array and comprising a first scan line; a second scan line; and at least one pixel unit comprising: a first pixel portion including a first switch and at least one first strip bar electrode, and the first switch is electrically connected with the first strip bar electrode and the at least one first strip bar electrode is arranged in an array along a direction parallel with the first scan line; and a second pixel portion including a second switch and at least one second strip bar electrode, and the second switch is electrically connected with the second strip bar electrode and the at least one second strip bar electrode is arranged in an array along a direction parallel with the second scan line; wherein a first straight line of the first strip bar electrode is intersected with a second straight line of the second strip bar electrode, and the second scan line is intersected with the second switch, the first scan line is configured for sending a first scan signal to the first switch to control turning on or off a first current channel between the first strip bar electrode and a data line, the second scan line is configured for sending a second scan signal to the second switch to control turning on or off a second current channel between the second strip bar electrode and the data line; and a lens board being stacked with the display panel.

According to the aforementioned display device, the first switch is configured for turning on the first current channel when the display device is in a 2D display mode for 2D image data transmitting into the first strip bar electrode, and the second switch is configured for turning on the second current channel when the display device is in the 2D display mode for the 2D image data transmitting into the second strip bar electrode.

According to the aforementioned display device, the first switch is configured for turning off the first current channel when the display device is in a 3D display mode for stopping 3D image data transmitting into the first strip bar electrode; the second switch is configured for turning on the second current channel when the display device is in the 3D display mode for the 3D image data transmitting into the second strip bar electrode.

According to the aforementioned display device, the lens board comprises a lens array having at least two strip bar lenses and the at least two strip bar lenses are arranged in parallel, and a first angle exists between the straight line of the strip bar lens and a connection line between the first pixel portion and the second pixel portion According to the aforementioned display device, the first angle is between 10° and 80°.

According to the aforementioned display device, a second angle exists between the first straight line and the connection line, and an absolute value of the second angle is larger or smaller than the absolute value of the first angle.

According to the aforementioned display device, a third angle exists between the second straight line and the connection line, and an absolute value of the third angle is larger or smaller than the absolute value of the first angle.

According to the aforementioned display device, the first strip bar electrode tilts to a direction the same as the strip bar lens thereof.

According to the aforementioned display device, a forth angle between the first straight line of the first strip bar electrode and the third straight line of the strip bar lens is between 0° and 60°.

According to the aforementioned display device, the forth angle is equal to or smaller than 45°.

According to the aforementioned display device, the method comprises a step of sending a first scan signal to the first switch by the first scan line to control turning on or off the first current channel between the first strip bar electrode and a data line; and a step of sending a second scan signal to the second switch by the second scan line to control turning on or off a second current channel between the second strip bar electrode and the data line.

According to the image displaying method of the aforementioned display device, the first switch turns on the first current channel when the display device is in a 2D display mode for 2D image data transmitting into the first strip bar electrode, and the second switch turns on the second current channel when the display device is in the 2D display mode for the 2D image data transmitting into the second strip bar electrode.

According to the image displaying method of the aforementioned display device, the first switch turns off the first current channel when the display device is in a 3D display mode for stopping 3D image data transmitting into the first strip bar electrode, and the second switch turns on the second current channel when the display device is in the 3D display mode for the 3D image data transmitting into the second strip bar electrode.

By comparing with the conventional arts, since one of the first pixel portion and the second pixel portion, which includes the same tilt direction as the bar lens, is turned off in the display device of the present invention and the other one is turned on, the light passing through the TFT array substrate and the lens board won't generate the optics interruption. When the display device is in the 3D display mode, the Moiré pattern is not generated on the scene of the display device and the display quality of the display device is increased.

DETAILED DESCRIPTION OF THE PREFERRED EMBODIMENTS

The above-mentioned description of the present invention can be best understood by referring to the following detailed description of the preferred embodiments and the accompanying drawings.

Figure 2:
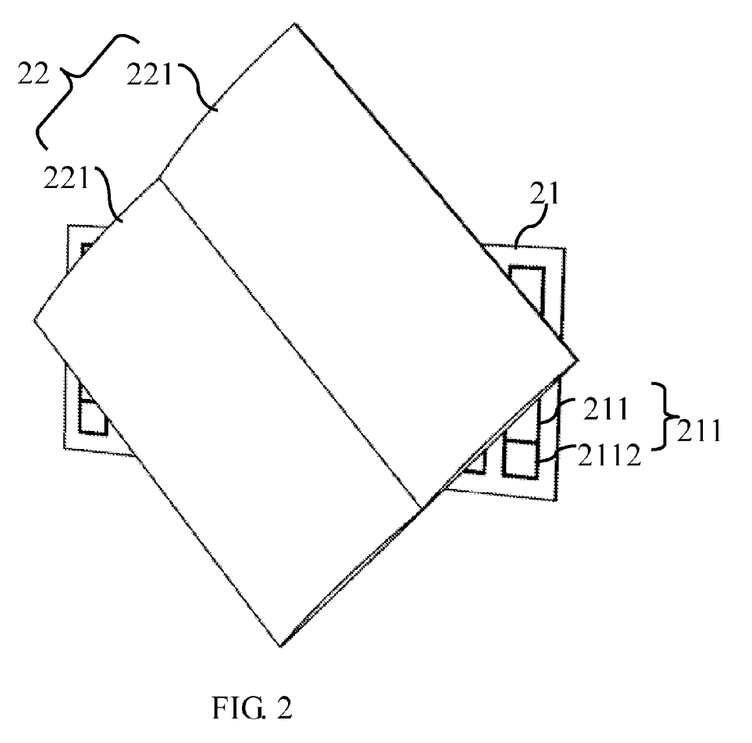
FIG. 2 is a structural view of a display device in a first embodiment of the present invention.
Figure 3:
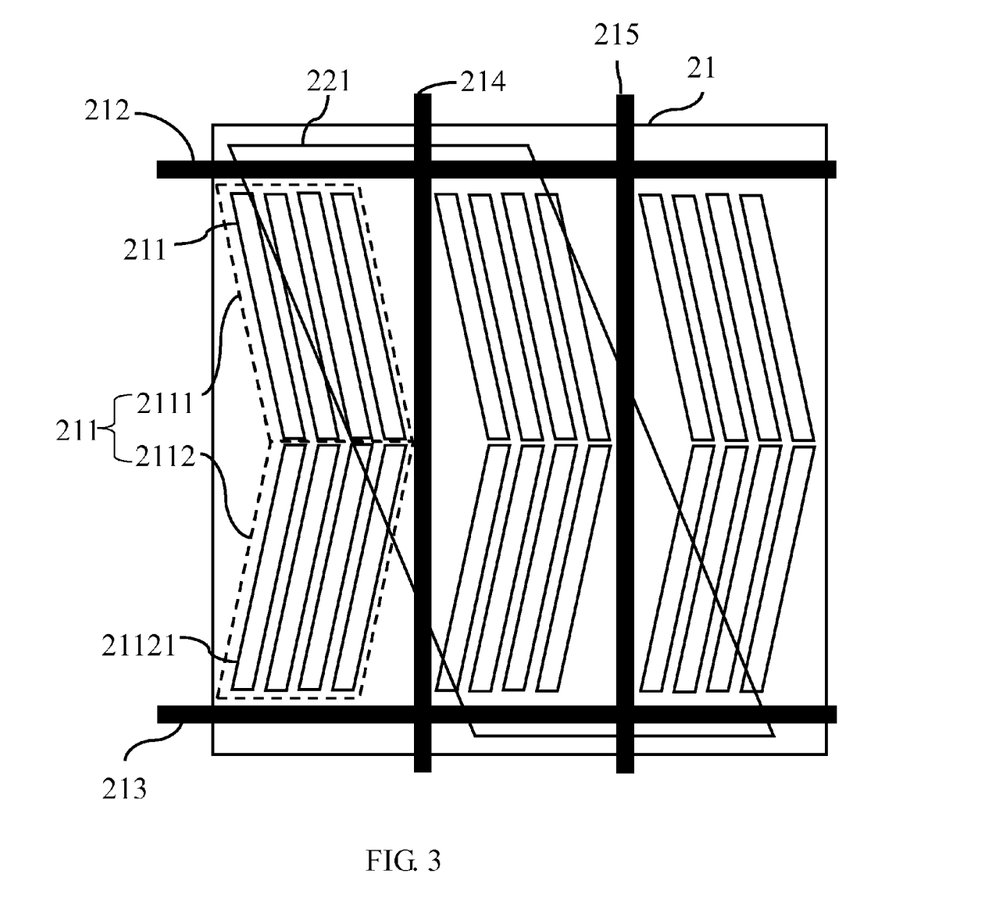
FIG. 3 is a structural view of a pixel unit of the display device shown in FIG. 2.

FIG. 2 is a structural view of a display device in a first embodiment of the present invention, and FIG. 3 is a structural view of a pixel unit 211 of the display device shown in FIG. 2.

The display device in the present embodiment includes a display panel 21 and a lens board 22. The lens board 22 and the display panel 21 are stacked together. Specifically, the lens board 22 is disposed on one surface of a color filter substrate facing away from a liquid crystal (LC) layer. The display panel 21 includes a thin film transistor (TFT) array substrate, the color filter substrate, and the LC layer. The TFT array substrate and the color filter substrate are disposed in parallel, and the LC layer is disposed between the TFT array substrate and the color filter substrate.

The TFT array substrate includes at least two pixel row units and at least two data lines (214, 215). The at least two pixel row units are arranged in columns. The two data lines (214, 215) are arranged in rows. The pixel row unit includes at least one pixel unit 211, a first scan line 212, and a second scan line 213. Within the same one pixel row unit, the pixel units 211 are arranged in rows, and the first scan line 212 and the second scan line 213 are connected with the pixel unit 211. The data line 214 is connected with the pixel unit 211 in the same column.

A BM layer is disposed on the color filter substrate. The BM layer includes at least two spacing bars, and the spacing bars are disposed at the edge of the pixel unit 211. The straight lines of the spacing bars are horizontal or vertical to the straight lines of the pixel row unit. The spacing bars and the straight lines of the pixel row unit form a spacing bar array with the same intervals in the vertical direction or the horizontal direction.

The pixel unit 211 includes a first pixel portion 2111 and a second pixel portion 2112, and the first pixel portion 2111 is adjacent to the second pixel portion 2112. The connection line of the first pixel portion 2111 and the second pixel portion 2112 is horizontal or vertical with respect to the straight line of the data line 214. As shown in FIG. 2, the following description is an example cited that the straight line of the first pixel portion 2111, the second pixel portion 2112, and the straight line of the data line 214 are disposed in parallel. The first pixel portion 2111 includes a first switch and a first strip bar electrode 21111. The first switch is connected with the first strip bar electrode 21111, the data line 214 and the first scan line 212. The first strip bar electrodes 21111 are arranged in an array along the horizontal direction. The first scan line 212 is configured for sending a first scan signal to the first switch to turn on or off the first current channel between the first strip bar electrode 21111 and the data line 214. The second pixel portion 2112 includes a second switch and a second strip bar electrode 21121. The second switch is connected with the second strip bar electrode 21121, the data line 214, and the second scan line 213. The second strip bar electrodes 21121 are arranged in an array along the horizontal direction. The first straight line in the first strip bar electrode and the second straight line in the second strip bar electrode intersect. In other words, the first straight line and the second straight line are not disposed in parallel.

The second scan line 213 is configured for sending a second scan signal to the second switch to turn on or off the second current channel between the second strip bar electrode 21121 and the data line 214. The first switch and the second switch can be in different statuses at the same time or during a period of time. In other words, when the first switch is in the turn-on status, the second switch is in the turn-off status, and when the first switch is in the turn-off status, the second switch is in the turn-on status. The first switch or the second switch can be a triode, such as a thin film transistor.

In the present embodiment, the lens board 22 includes a lens array, and the lens array includes at least two strip bar lenses 221 disposed along a first direction. The strip bar lenses 221 are disposed in columns and along a first direction. The first direction is vertical to the direction of a third straight line of the strip bar lens 221. The third straight line of the strip bar lens 221 and the connection line between the first pixel portion 2111 and the second pixel portion 2112 include a first angle. The first angle is between 10° and 80°. For example, the first angle can be 10°, 14°, 17°, 19°, 17°, 23°, 26°, 29°, 31°, 34°, 36°, 38°, 40°, 43°, 45°, 47°, 50°, 52°, 55°, 57°, 59°, 62°, 66°, 67°, 69°, 71°, 73°, 76°, 78°, 80° and so on. The intervals between any two of the adjacent strip bar lenses 221 are the same. The structures of the lens arrays along the first direction are periodically similar.

In the present embodiment, the first straight line and the connection line include a second angle. The absolute value of the second angle is larger or smaller than the first angle thereof. The second straight line and the connection line include a third angle. The absolute value of the third angle is larger or smaller than the absolute value of the first angle. For example, the second angle and the third angle can be positive angle/negative angle and negative angle/position angle. The second angle and the third angle are between 20° and 70°. For example, the second angle and the third angle can be 20° and −20°, 23° and −23°, 25° and −25°, 29° and −29°, 31° and −31°, 34° and −34°, 36° and −36°, 38° and −38°, 41° and −41°, 44° and −44°, 45° and −45°, 48° and −48°, 50° and −50°, 53° and −53°, 56° and −56°, 59° and −59°, 61° and −61°, 64° and −64°, 67° and −67°, 70° and −70°, and so on.

In the present embodiment, the first strip bar electrode and the strip bar lens include the same tilting direction. In other words, the first strip bar electrode and the strip bar lens tilt towards the same direction. Specifically, the forth angle between the first straight line of the first strip bar electrode and the third straight line of the strip bar lens is between 0° and 60°. Preferably, the forth angle is smaller than 45°.

In the present embodiment, the display device further includes a controller, and the controller is to switch the display mode of the display device. The display mode includes a 2D display mode and a 3D display mode. In other words, the controller is configured for switching from the 2D display mode to the 3D display mode in the display device and vice versa.

When the display device is switched from the 2D display mode to the 3D display mode, the controller is configured for sending a first scan signal to the first switch through the first scan line 212 to turn off the first switch and sending a second scan signal to the second switch through the second scan line 213 to turn of the second switch. In the present embodiment, the first switch is configured for turning off the first current channel to stop the 3D display data from inputting to the first strip bar electrode 21111 when the display device is in the 3D display mode. The second switch is configured for turning on the second current channel to input the 3D display data into the second strip bar electrode when the display device is in the 3D display mode.

When the display device is switched from 3D display mode to the 2D display mode, the controller is configured for sending the first scan signal to the first switch through the first scan line 212 to turn on the first switch and sending the second scan signal to the second switch through the second scan line 213 to turn on the second switch. In the present embodiment, the first switch is configured for turning on the first current channel when the display device is in the 2D display mode for the 2D image data transmitting into the first strip bar electrode 21111. The second switch is configured for turning on the second current channel when the display device is in the 2D display mode for the 2D image data transmitting into the second strip bar electrode 21121.

When the display device is in the 2D display mode, the first switch and the second switch are turned on or off at the same time. When the display device is in the 3D display mode, the first switch, which corresponds to the first strip bar electrode with the same tilting direction as the strip bar lens, is turned off, and the second switch, which corresponds to the second strip bar electrode with a different tilting direction from the strip bar lens, is turned on. Therefore, light won't pass through the area of the strip bar lens where an optics interruption occurs. The interrupting strips in some areas are eliminated, and the generation of the Moiré pattern is reduced.

Since the strip bar lens 221 in the lens board 22 is arranged along the first direction and the first direction is vertical with respect to the straight line of the strip bar lens 221. The first angle is between the straight line of the strip bar lens 221 and the connection line, which is between the first pixel portion 2111 and the second pixel portion 2112. The first angle is between 10° and 80°. The arranging direction of the spacing bar array is horizontal or vertical with respect to the connection line between the first pixel portion 2111 and the second pixel portion 2112. Therefore, when the display device is in the 3D display mode, light won't pass through the area of the strip bar lens where an optics interruption has occurred. The generation of the Moiré pattern can be avoided, and the display quality of the display device can be enhanced.

In addition, since one of the first pixel portions and the second pixel portions, which includes the same tilt direction as the strip bar lens, is turned off and the other one is turned on, the light passing through the TFT array substrate and the lens board won't generate the optics interruption. When the display device is in the 3D display mode, the Moiré pattern is not generated on the screen of the display device, and the display quality of the display device is increased.

In addition, since the second angle between the first strip bar electrode and the connection line is different from the first angle, and the third angle between the second strip bar electrode and the connection line is different from the first angle, the light passing through the TFT array substrate and the lens board won't generate the optics interruption.

When the display device is in the 2D display mode, the screen of the display device won't generate the Moiré pattern, and the display quality of the display device is enhanced.

The method for displaying images in the aforementioned display device of the present invention includes the following steps.

Figure 4:
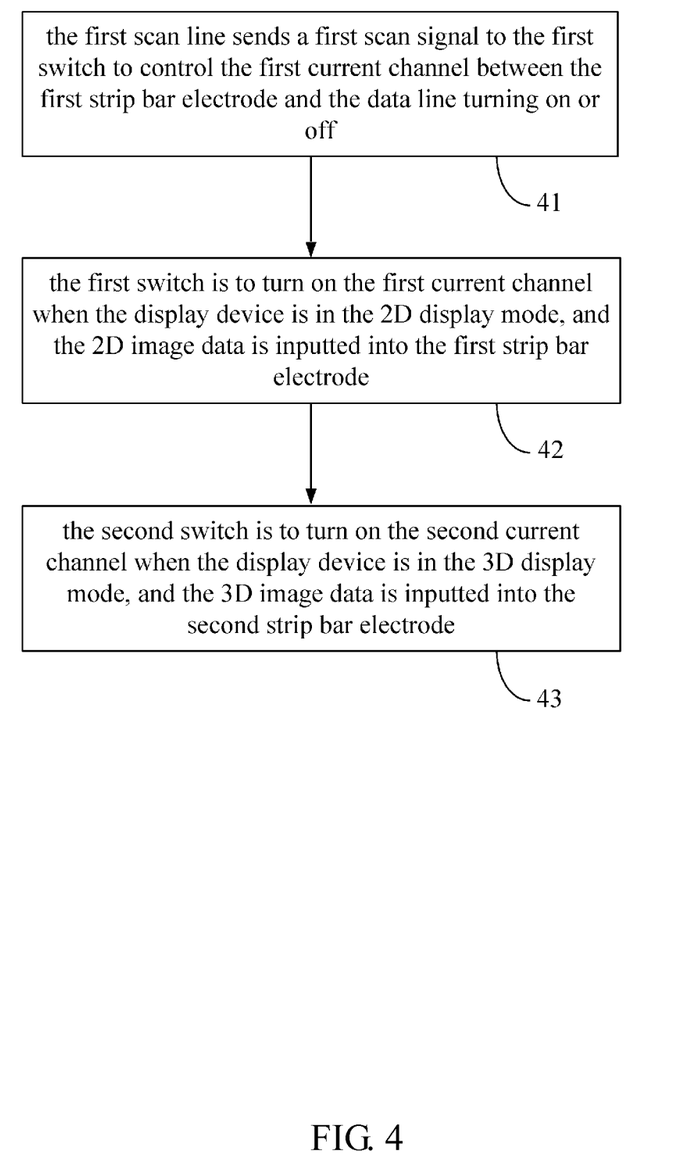
FIG. 4 is a flow chart illustrating an image displaying method of the display device of the present invention in 2D display mode.

In step 41, the first scan line 212 sends a first scan signal to the first switch to control the first current channel between the first strip bar electrode 21111 and the data line 214 turning on or off. The second scan line 213 sends the second scan signal to the second switch to control the second current channel between the second strip bar electrode 21121 and the data line 214 turning on or off. Specifically, when the display device is in the 2D display mode, the first scan signal is configured for turning on the first switch and the second scan signal is configured for turning on the second switch. Alternatively, when the display device is in the 3D display mode, the first scan signal is configured for turning off the first switch and the second scan signal is configured for turning on the second switch.

In step 42, the first switch is to turn on the first current channel when the display device is in the 2D display mode, and the 2D image data is inputted into the first strip bar electrode 21111.

In step 43, the second switch is to turn on the second current channel when the display device is in the 3D display mode, and the 3D image data is inputted into the second strip bar electrode 21121.

Figure 5:
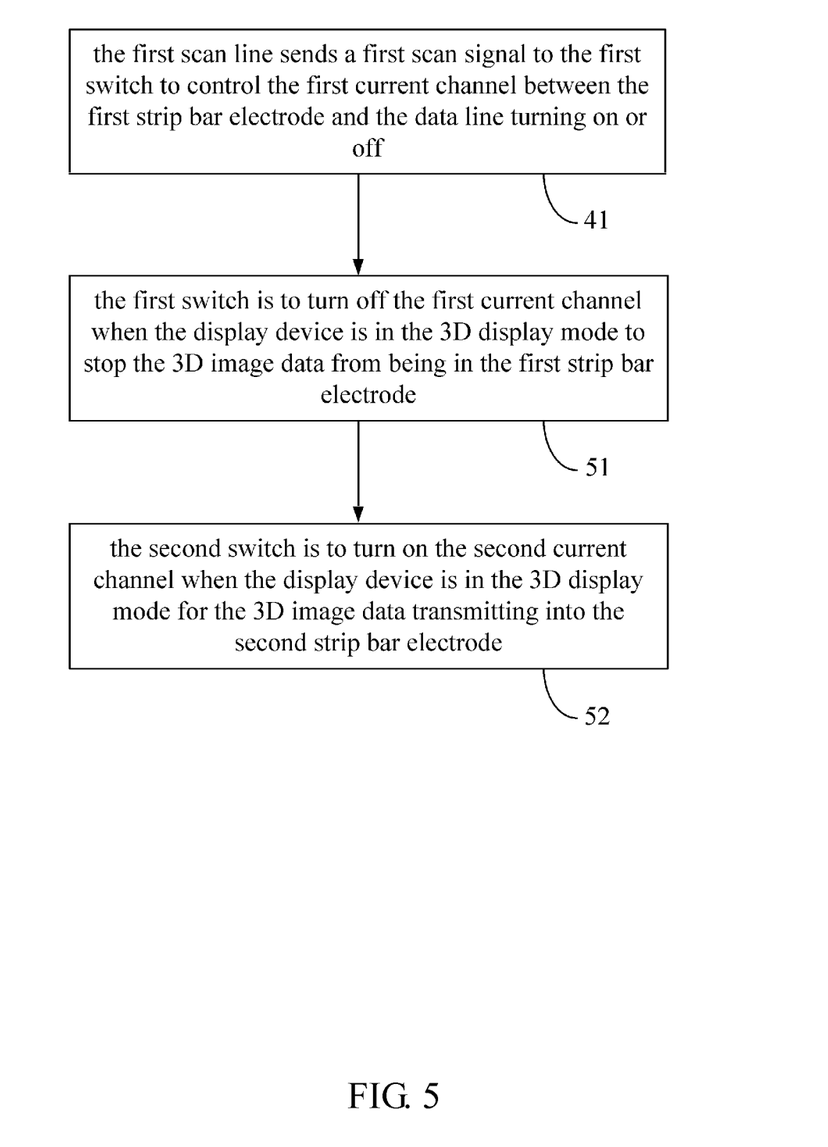
FIG. 5 is a flow chart illustrating an image display method of the display device of the present invention in 3D display mode.

In step 51, the first switch is to turn off the first current channel when the display device is in the 3D display mode to stop the 3D image data from being in the first strip bar electrode 21111.

In step 52, the second switch is to turn on the second current channel when the display device is in the 3D display mode for the 3D image data transmitting into the second strip bar electrode 21121.

Step 42 and step 43 can be synchronously or asynchronously executed. For example, step 42 is executed first and then step 43 is executed, or step 43 is executed first and then step 42 is executed. Similarly, step 51 and step 52 can be synchronously or asynchronously executed. For example, step 51 is executed first and then step 52 is executed, or step 52 is executed and then step 51 is executed.

The present invention has been described with preferred embodiments thereof, and it is understood that many changes and modifications to the described embodiments can be carried out without departing from the scope and the spirit of the disclosure that is intended to be limited only by the appended claims.

What is claimed is:
1. A display device, comprising:
a display panel comprising a thin film transistor (TFT) array substrate, a color filter substrate and a liquid crystal (LC) layer, and the TFT array substrate comprises:
at least one pixel row unit arranged in an array and comprising:
a first scan line;
a second scan line; and
at least one pixel unit comprising:
a first pixel portion including a first switch and at least one first strip bar electrode, and the first switch being electrically connected with the first strip bar electrode and the at least one first strip bar electrode being arranged in an array along a direction parallel with the first scan line; and
a second pixel portion including a second switch and at least one second strip bar electrode, and the second switch being electrically connected with the second strip bar electrode and the at least one second strip bar electrode being arranged in an array along a direction parallel with the second scan line;
wherein a first straight line of the first strip bar electrode is intersected with a second straight line of the second strip bar electrode, and the second scan line is intersected with the second switch, the first scan line is configured for sending a first scan signal to the first switch to control turning on or off a first current channel between the first strip bar electrode and a data line, the second scan line is configured for sending a second scan signal to the second switch to control turning on or off a second current channel between the second strip bar electrode and the data line; and
a lens board being stacked with the display panel and the lens board comprises:
a lens array comprising at least two strip bar lenses and the at least two strip bar lenses being arranged in parallel, and a first angle exists between the straight line of the strip bar lens and a connection line between the first pixel portion and the second pixel portion;
wherein the first switch is configured for turning on the first current channel when the display device is in a 2D display mode for 2D image data transmitting into the first strip bar electrode;
the second switch is configured for turning on the second current channel when the display device is in the 2D display mode for the 2D image data transmitting into the second strip bar electrode;
the first switch is configured for turning off the first current channel when the display device is in a 3D display mode for stopping 3D image data from being into the first strip bar electrode;
the second switch is configured for turning on the second current channel when the display device is in the 3D display mode for the 3D image data transmitting into the second strip bar electrode.

2. The display device according to claim 1, wherein the first angle is between 10° and 80°.

3. The display device according to claim 1, wherein a second angle exists between the first straight line and the connection line, and an absolute value of the second angle is greater or less than the absolute value of the first angle.

4. The display device according to claim 1, wherein a third angle exists between the second straight line and the connection line, and an absolute value of the third angle is greater or less than the absolute value of the first angle.

5. The display device according to claim 1, wherein the first strip bar electrode tilts to a direction which is the same as the strip bar lens thereof.

6. The display device according to claim 5, wherein a forth angle between the first straight line of the first strip bar electrode and the third straight line of the strip bar lens is between 0° and 60°.

7. The display device according to claim 6, wherein the forth angle is equal to or less than 45°.

8. A display device, comprising:
a display panel comprising a TFT array substrate, a color filter substrate and an LC layer, and the TFT array substrate comprises:
at least one pixel row unit arranged in an array and comprising:
a first scan line;
a second scan line; and
at least one pixel unit comprising:
a first pixel portion including a first switch and at least one first strip bar electrode, and the first switch being electrically connected with the first strip bar electrode and the at least one first strip bar electrode being arranged in an array along a direction parallel with the first scan line; and
a second pixel portion including a second switch and at least one second strip bar electrode, and the second switch being electrically connected with the second strip bar electrode and the at least one second strip bar electrode being arranged in an array along a direction parallel with the second scan line;
wherein a first straight line of the first strip bar electrode is intersected with a second straight line of the second strip bar electrode, and the second scan line is intersected with the second switch, the first scan line is configured for sending a first scan signal to the first switch to control turning on or off a first current channel between the first strip bar electrode and a data line, the second scan line is configured for sending a second scan signal to the second switch to control turning on or off a second current channel between the second strip bar electrode and the data line; and
a lens board being stacked with the display panel.

9. The display device according to claim 8, wherein the first switch is configured for turning on the first current channel when the display device is in a 2D display mode for 2D image data transmitting into the first strip bar electrode, and the second switch is configured for turning on the second current channel when the display device is in the 2D display mode for the 2D image data transmitting into the second strip bar electrode.

10. The display device according to claim 8, wherein the first switch is configured for turning off the first current channel when the display device is in a 3D display mode for stopping 3D image data from transmitting into the first strip bar electrode; the second switch is configured for turning on the second current channel when the display device is in the 3D display mode for the 3D image data transmitting into the second strip bar electrode.

11. The display device according to claim 8, wherein the lens board comprises a lens array having at least two strip bar lenses and the at least two strip bar lenses are arranged in parallel, and a first angle exists between the straight line of the strip bar lens and a connection line between the first pixel portion and the second pixel portion.

12. The display device according to claim 11, wherein the first angle is between 10° and 80°.

13. The display device according to claim 11, wherein a second angle exists between the first straight line and the connection line, and an absolute value of the second angle is greater or less than the absolute value of the first angle.

14. The display device according to claim 11, wherein a third angle exists between the second straight line and the connection line, and an absolute value of the third angle is greater or less than the absolute value of the first angle.

15. The display device according to claim 11, wherein the first strip bar electrode tilts to a direction which is the same as the strip bar lens thereof.

16. The display device according to claim 15, wherein a forth angle between the first straight line of the first strip bar electrode and the third straight line of the strip bar lens is between 0° and 60°.

17. The display device according to claim 16, wherein the forth angle is equal to or less than 45°.

18. An image displaying method according to the display device of claim 8, wherein the method comprises:
sending a first scan signal to the first switch by the first scan line to control turning on or off the first current channel between the first strip bar electrode and a data line; and
sending a second scan signal to the second switch by the second scan line to control turning on or off a second current channel between the second strip bar electrode and the data line.

19. The image displaying method according to claim 18, wherein the first switch turns on the first current channel when the display device is in a 2D display mode for 2D image data transmitting into the first strip bar electrode, and the second switch turns on the second current channel when the display device is in the 2D display mode for the 2D image data transmitting into the second strip bar electrode.

20. The image displaying method according to claim 18, wherein the first switch turns off the first current channel when the display device is in a 3D display mode for stopping 3D image data from being into the first strip bar electrode, and the second switch turns on the second current channel when the display device is in the 3D display mode for the 3D image data transmitting into the second strip bar electrode.

* * * * *